United States Patent [19]

Martner et al.

[11] Patent Number: 4,823,149

[45] Date of Patent: Apr. 18, 1989

[54] INK JET APPARATUS EMPLOYING PLATE-LIKE STRUCTURE

[75] Inventors: John G. Martner, Brookfield; William R. Gardner, Wilton, both of Conn.; Viasheslav B. Maltsev, Stormville, N.Y.

[73] Assignee: Dataproducts Corporation, Woodland Hills, Calif.

[21] Appl. No.: 23,706

[22] Filed: Mar. 9, 1987

[51] Int. Cl.[4] ............ G01D 15/16

[52] U.S. Cl. ............ 346/140 R; 417/322

[58] Field of Search ............ 346/140; 417/322

[56] References Cited

U.S. PATENT DOCUMENTS

| | | | |
|---|---|---|---|
| 4,353,078 | 10/1982 | Lee | 346/140 |
| 4,385,304 | 5/1983 | Sniderman | 346/140 |
| 4,387,383 | 6/1983 | Sayko | 346/140 |
| 4,446,469 | 5/1984 | Perna | 346/140 |
| 4,459,601 | 7/1984 | Howkins | 346/140 |
| 4,578,686 | 3/1986 | Vollert | 346/140 |

OTHER PUBLICATIONS

Krause, K. A.; Focusing Ink Jet Head, IBM TDB, vol. 16, No. 4, Sep. 1973, p. 1168.

*Primary Examiner*—Joseph W. Hartary

*Attorney, Agent, or Firm*—Woodcock Washburn Kurtz Mackiewicz & Norris

[57] ABSTRACT

Impulse ink jets utilizing elongated transducers which expand and contract along the axis of elongation are formed by plates lying in planes parallel with the axis of elongation. The plates containing the chamber also include a drive portion for coupling the transducer to the chamber where the drive portion is supported by struts which extend to a support means also formed by the plates.

21 Claims, 2 Drawing Sheets

INK JET APPARATUS EMPLOYING PLATE-LIKE STRUCTURE

BACKGROUND OF THE INVENTION

This invention relates generally to impulse or demand ink jets, and more particularly, to such ink jets wherein a piezoelectric transducer has an axis of elongation so as to expand and contract along the axis of elongation, thereby changing the volume of ink in an ink jet chamber including an orifice.

In such demand ink jets, it is common practice to utilize a plate-like structure where the plates extend transverse to the axis of the orifice and transverse to the axis of elongation of the transducer. Such an ink jet apparatus is disclosed in U.S. Pat. No. 4,459,601, which is assigned to the assignee of the present invention and incorporated herein by reference. Since the transducer is transverse to the plate-like members, it is not possible to sandwich the transducers between the plate-like structure and thereby take advantage of the cost-effectiveness of this plate-like approach. Moreover, it is not possible to achieve high density arrays with different ink jets located in different plates stacked one on another.

SUMMARY OF THE INVENTION

It is an object of this invention to take full advantage of a plate-like structure in an ink jet apparatus wherein an elongated transducer expands and contracts along its axis of elongation.

It is a more specific object of this invention to achieve such benefit by minimizing the cost of the ink jet apparatus.

It is a further specific object of this invention to achieve such a benefit with a high density array.

In accordance with these and other objects of the invention, a preferred embodiment comprises an ink jet chamber including an orifice with an axis and an elongated transducer means coupled to the chamber for changing the volume of the chamber in response to the state of energization of the transducer means by expanding and contracting along the axis of elongation.

In accordance with one important aspect of the invention, the apparatus comprises coupling means in communication with the transducer means. The coupling means comprises a drive portion juxtaposed to the transducer means in the ink jet chamber and a supporting portion, including at least one strut, connected to a support means. The strut extends from the drive portion in a direction substantially transverse to the axis of elongation and is attached to the support means. The strut includes an area of relief in advance thereof toward the chamber and an area of relief behind and away from the chamber so as to permit the strut to flex toward the chamber and away from the chamber in the direction of the axis of the orifice, thereby permitting the drive portion to move toward the chamber and away from the chamber.

In the preferred embodiment of the invention, the apparatus comprises more than one strut. Preferably, the struts extend in opposite directions from the drive portion toward the support means. Additional struts may be spaced along the drive portion in the direction of the axis of the orifice.

In the preferred embodiment of the invention, the ink jet chamber, the coupling means and the support means are all formed from the same integral member. This permits a plate-like structural approach to the ink jet, even with the use of the elongated transducer. Additional plates on opposite sides of the plate, including the chamber, are employed to close the fluidic channels including the chamber.

In the preferred embodiment of the invention, the apparatus may comprise an inlet manifold, a vent and/or restricted passageways so as to provide a diode effect in the fluidic channels. The manifold, the vent and the restricted passageways may all be formed from the same plate-like member which forms the chamber.

In accordance with another important aspect of the invention, the chamber is characterized by a maximum dimension transverse to the axis of the orifice which is substantially greater than the minimum dimension of the chamber transverse to the axis of the orifice. Preferably, the maximum dimension is at least ten (10) times greater than the minimum dimension. In order to focus the ink on the orifice, the coupling means between the transducer and the orifice is concave with respect to the orifice so as to focus the ink pressure wave generated.

In one preferred embodiment of the invention, the plate coupling portion between the transducer and the chamber extends further toward the transducer than the support means.

In a preferred embodiment of the invention, the ink jet apparatus comprises a plurality of plate-like members wherein non-contiguous plate-like members contain the chambers and orifices of the ink jets. The orifices in the non-contiguous plates may be arranged so as to achieve a substantially linear array extending from plate to plate in the apparatus. In addition, each plate containing an ink jet chamber and orifice may contain a plurality of spaced chambers and orifices so as to achieve a plurality of linear arrays. In such an apparatus, different colored inks may be utilized in each linear array.

DETAILED DESCRIPTION OF PREFERRED EMBODIMENTS

Figure 1:
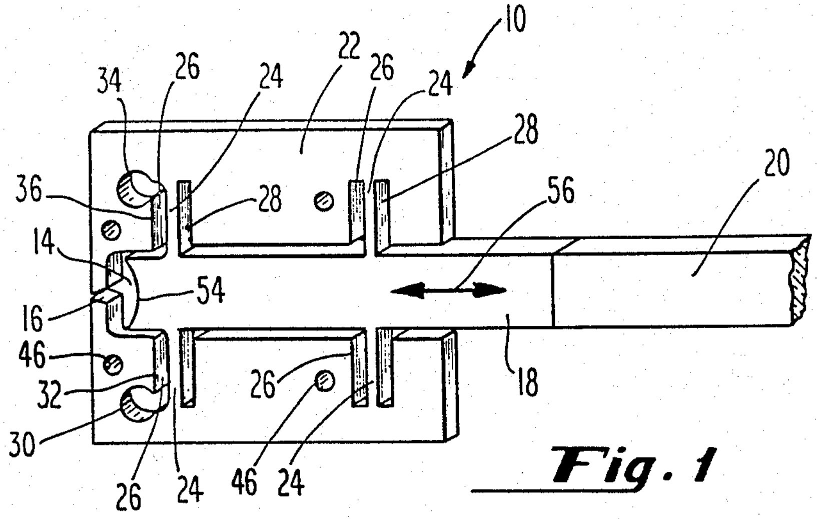
FIG. 1 is a perspective view of a single plate-like structure partially forming an ink jet apparatus representing a preferred embodiment of the invention.
Figure 2:
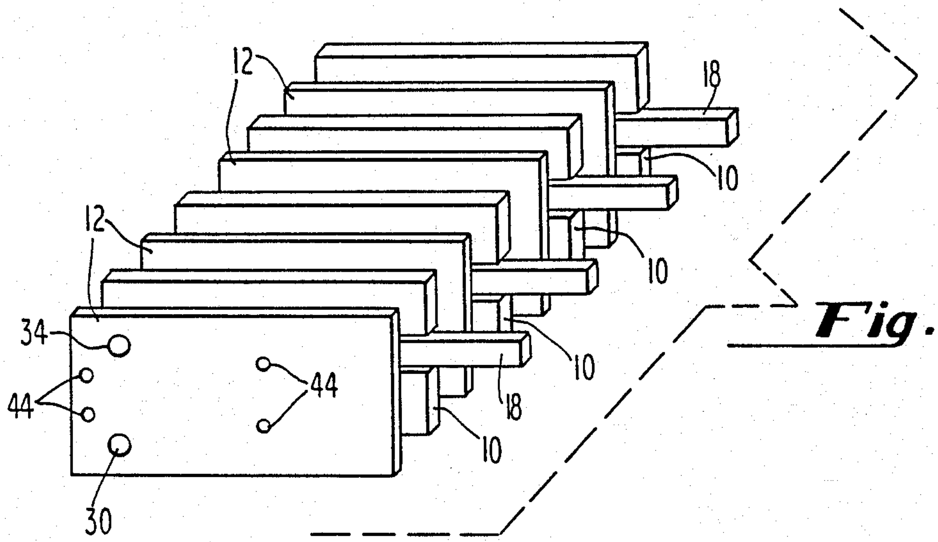
FIG. 2 is an exploded view of a plurality of the plate-like structure shown in FIG. 1 with spacer plates therebetween.
Figure 3:
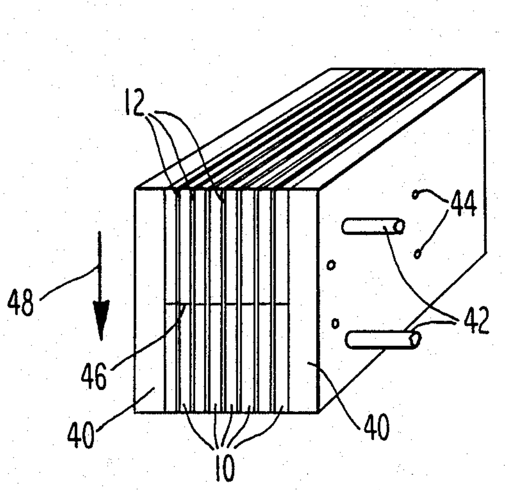
FIG. 3 is a perspective view of the assembled apparatus of FIG. 2.

Referring to FIGS. 1 through 3, an impulse ink jet apparatus formed from an assembly of plates comprising individual, non-contiguous plates 10 sandwiched between separating plates 12. Each of the plates 10 comprises and forms a chamber 14 as shown in FIG. 1 which includes an orifice 16, while the separating plates 12 form inter-channel septa for reducing fluidic crosstalk between adjacent orifices 16. The plate 10 further comprises a coupling means or drive portion 18 at the rear of the chamber juxtaposed to the orifice 16 and coupled to a transducer 20. The coupling means 18 is supported by the support means 22 by struts 24.

As clearly shown in FIG. 1, the chamber 14, the coupling means or foot 18, the support means 22 and the struts 24 all are formed from a single plate. This facilitates the economical manufacture of the ink jet apparatus shown in FIGS. 1 through 3 in accordance with one important aspect of the invention.

It will be appreciated that the struts 24 permit sufficient movement of the foot 18 in response to energization of the transducer 20 along its axis of elongation in each direction generally toward and away from the chamber 14 so as to permit the volume of the chamber 14 to be expanded and contracted for purposes of ejecting droplets of ink from the orifice 16. For this purpose, an area of relief 26 is provided in front of each of the struts 24. In addition, an area of relief 28 is provided behind each of the struts 24.

As shown in FIG. 1, a plurality of struts 24 are utilized. Preferably, the struts 24 extend transversely on opposite sides of the foot 18. It is also preferred to have a plurality of struts along the axis of movement of the transducer 20 and the foot 18 so as to optimize support of the foot 18.

As discussed above, the chamber 14, the foot 18, the support portion 22 and the struts 24 are all integrally formed from the same plate. It is also preferable to form an input manifold 30 with a passageway 32 and a vent manifold 34 with a passageway 36 from the same plate. Note that the areas of relief 26 actually form and are coincident with the passageways 32 and 36. The manifold 30 and 34 are formed by corresponding orifices in the septa, adjacent thereto so as to form canals whose axes of elongation are perpendicular to the plan of the foot 18. This allows ink to reach the channels from a common source of ink located externally from the channel structure and connected there by tubes 42 (FIG. 3).

From the foregoing, it will be appreciated that the transducer 20 expands and contracts along its axis of elongation which is coincident with the axis of the orifice 16. This motion of the transducer, which in turn creates motion of the foot 18, is achieved by applying the field transverse to the transducer 20 in accordance with the disclosure of the aforesaid U.S. Pat. No. 4,459,601.

Referring now to FIGS. 2 and 3, it will be appreciated that the various plates 10 and 12 are sandwiched together to form the assembly 38 shown in FIG. 3. These plates are clamped together by clamping end plates 40.

It will be appreciated that each of the input manifold openings 30 and vent manifolds 34 are aligned so as to permit each of the chambers 14 to be supplied by ink by means of tubes 42 shown in FIG. 3. This alignment is achieved by use of locator pins 44 which are inserted through openings 46 shown in FIG. 1. When the various plates 10, 12 and 40 are clamped together as shown in FIG. 3, a linear array of orifices depicted by a line 46 is achieved. With this array, which may be the height, for example, of an alpha-numeric character, travel of the plate-like structure shown in FIG. 3 in a direction indicated by arrow 48 will achieve printing of an entire alpha-numeric character with a single pass. In other words, a very high density of ink jet orifices is achieved.

Figure 4:
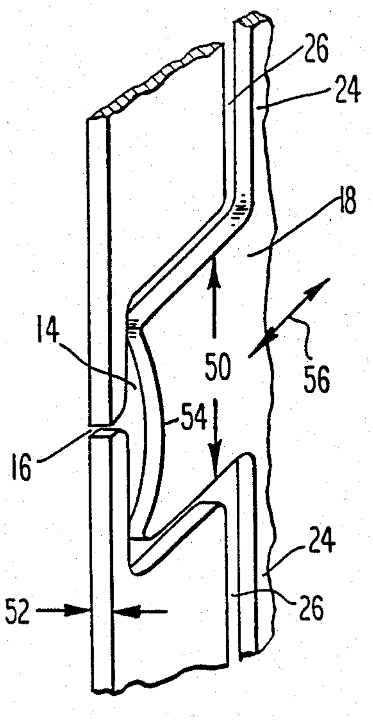
FIG. 4 is a partial and enlarged perspective view of the chamber shown in FIG. 1.

It will be appreciated that the chamber 14 which is achieved with the apparatus shown in FIG. 4 has substantially greater dimensions in one direction than in another. More specifically, the length of the chamber as depicted by the arrow 50 in FIG. 4 is substantially greater than the width of the chamber as depicted by the arrows 52. In other words, the maximum dimension of the chamber 14 in a direction transverse to the axis of the orifice 16 (i.e., "length") is substantially greater than the minimum dimension of the chamber 14 in a direction transverse to the axis of the orifice 16 (i.e., "width"). Preferably, the ratio of this length to the width is at least 10:1, with 18:1 being considered optimum. With this configuration for a chamber, it is desirable to focus the ink on the orifice 16. For this purpose, the end of the foot 18, which is juxtaposed to the orifice 16, comprises a concave surface 54. Note the arrow 56 in FIGS. 1 and 4 which depict the motion of the foot 18.

Figure 5:
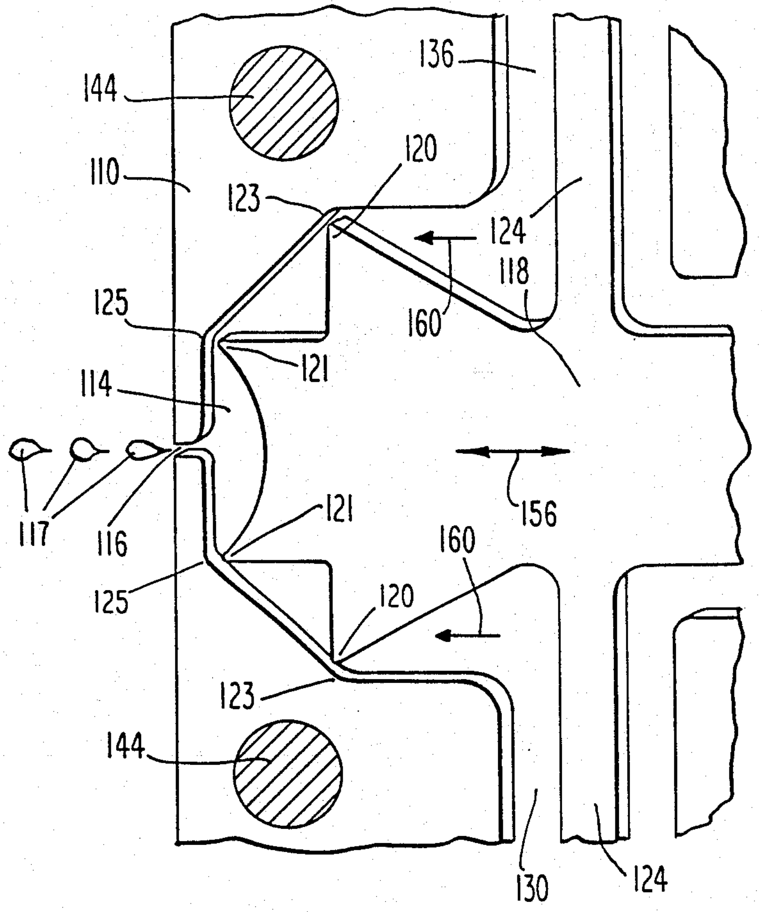
FIG. 5 is a partial and enlarged plan view of a plate-like structure in an embodiment modified from that shown in FIGS. 1 through 4.

An alternative embodiment of the fluidic section of the apparatus shown in FIGS. 1 through 4 is depicted in FIG. 5. In this embodiment, the foot 118 comprises a somewhat different shape to achieve a plurality of restrictors which are dynamically positioned so as to function as valves or fluidic diodes. More specifically, points 120 and 121 are juxtaposed respectively to corners 123 and 125 in the plate 110. As the foot 118 moves in the direction depicted by the arrows 156, the flow of ink, depicted by arrows 160, is alternately restricted and facilitated at the locations of the points 120 and 121. As a result, a dynamic restrictor is achieved for controlling the flow of ink into the chamber 114 and the ejection of droplets 117 through the orifice 116.

Although only a portion of the plate 110 is shown, and that portion includes locating pins 144, it will be appreciated that the remainder of the plate and its associated transducer is similar to that shown in FIG. 1 so as to permit incorporation into an apparatus similar to that shown in FIG. 3.

Figure 6:
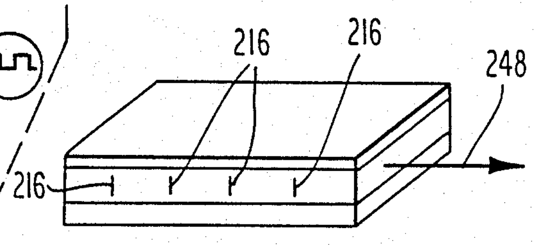
FIG. 6 is a perspective view showing a plurality of linear arrays achieved from a plurality of plate-like structures of the type shown in FIGS. 1 through 5.

In the previously described embodiments, each of the plates 10 or 110 included a single chamber and associated coupling means or foot 18 or 118 for its associated transducer. It is, of course, possible to provide a plurality of chambers, coupling means and transducers for each plate. FIG. 6 shows such an embodiment where four linear arrays of orifices 216 are displaced along a direction of travel 248. It will be appreciated that each of the orifices of the arrays 216 is in a single plate with each plate having four such orifices. With this embodiment, it is possible to utilize different colored inks in each linear array 216 so as to achieve, for example, a four color printhead. This, of course, requires separate input and vent manifolds for each of the linear arrays 216. Otherwise, the apparatus shown in FIG. 6 is substantially identical to that shown in FIGS. 1 through 3.

Figure 7:
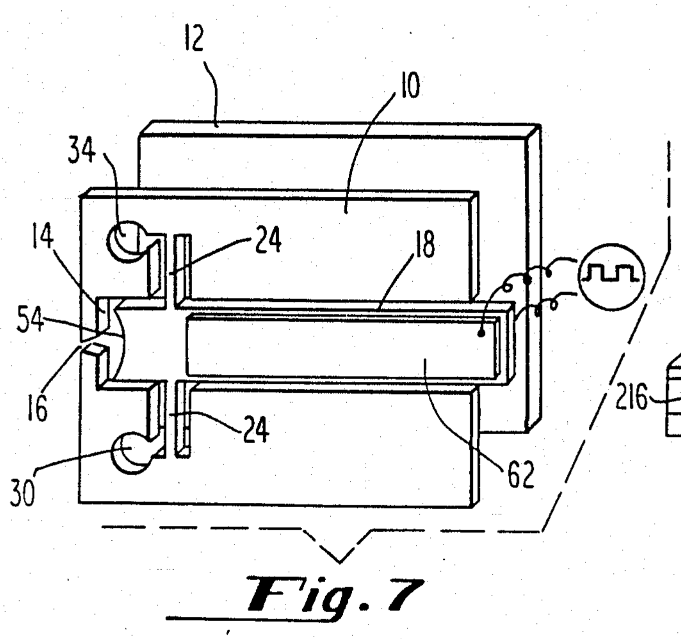
FIG. 7 is an alternative embodiment of the invention wherein the plate-like structure forming the chamber forms part of the transducer.

FIG. 7 depicts an embodiment of the invention wherein even the transducer has been integrated into a single plate. In the embodiment of FIG. 7, the accompanying means 18 is sandwiched between a strip of piezoelectric material 62 and another strip of piezoelectric material on the opposite side of the foot 18 which is not shown so as to form a trimorph. The strip 62 together with that not shown are coupled to a source of electric driving pulses as schematically depicted. The net result is a trimorph which moves the foot 18 toward and away from the orifice 16 as discussed with respect to the embodiment of FIGS. 1 through 3.

From the foregoing, it will be appreciated that cost effective ink jets using elongated transducers are adapted to expand and contract along their axes of elongation which are coincident with the axes of the orifice have been achieved. More particularly, substantial soldering and bonding of the parts has been eliminated and yet a very high density array has been achieved. Fabrication of the individual plates may be achieved economically by a chemical milling technique.

Although a particular embodiment of the invention has been shown and described, other embodiments will occur to those of ordinary skill in the art which will fall within the true spirit and scope of the invention as set forth in the appended claims.

We claim:

1. An ink jet apparatus comprising:

an ink jet chamber including an orifice;

elongated transducer means for changing the volume of the chamber in response to the state of energization of said transducer means by expanding and contracting along the axis of elongation;

a support means;

coupling means in communication with said support means and said transducer means, said coupling means comprising a drive portion juxtaposed to said transducer means in said ink jet chamber and a supporting portion including at least one strut, said strut extending from said drive portion in a direction substantially transverse to the axis of said orifice said strut having an area of relief in advance thereof toward said chamber and an area of relief behind and away from said chamber so as to permit said strut to flex toward said chamber and away from said chamber in the direction of said axis of the orifice thereby permitting said drive portion to move toward said chamber and away from said chamber.

2. The ink jet apparatus of claim 1, including more than one said strut.

3. The ink jet apparatus of claim 2 comprising struts extending in opposite directions from said drive portion to said support means.

4. The ink jet apparatus of claim 3 comprising struts spaced along said drive portion in the direction of said axis of the orifice.

5. The ink jet apparatus of claims 1, 2 or 3 wherein said ink jet chamber, said coupling means and said support means are all formed from the same integral member.

6. The ink jet apparatus of claim 5 wherein said integral member comprises a plate.

7. The ink jet apparatus of claim 6 further comprising plates on opposing sides of said plate to form said chamber.

8. The ink jet apparatus of claim 1 wherein said apparatus further comprises an inlet manifold, said ink jet chamber, said coupling means, said support means and said manifold all being formed from the same integral member.

9. The ink jet apparatus of claim 8 wherein said integral member comprises a plate.

10. The ink jet apparatus of claim 9 further comprising plates on opposing sides of said plate to form said chamber and said manifold.

11. The ink jet apparatus of claim 8 wherein said apparatus further comprises a restricted passageway between said ink jet chamber and said manifold, said restricted passageway also being formed from said integral member.

12. The ink jet apparatus of claim 8 wherein said apparatus further comprises a vent manifold also formed from said same integral member.

13. The ink jet apparatus of claim 12 wherein said integral member comprises a plate.

14. The ink jet apparatus of claim 13 further comprising plates on opposing sides of said plate to form said chamber, said inlet manifold and said vent manifold.

15. The ink jet apparatus of claim 12 wherein said apparatus further comprises another restricted passageway between said ink jet chamber and said vent manifold also formed from said same integral member.

16. The ink jet apparatus of claim 1 wherein said chamber includes an orifice juxtaposed to said coupling means, said chamber having a maximum dimension transverse to said axis of the orifice substantially greater than the minimum dimension of such chamber transverse to said axis of the orifice.

17. The ink jet apparatus of claim 16 wherein said maximum dimension is at least ten times greater than said minimum dimension.

18. The ink jet apparatus of claim 17 wherein said coupling means juxtaposed to said orifice is concave with respect to said orifice so as to focus ink on said orifice.

19. The ink jet apparatus of claim 1 wherein said chamber includes an orifice juxtaposed to said coupling means, said coupling means being concave with respect to said orifice so as to focus ink on said orifice.

20. The ink jet apparatus of claim 1 wherein said drive portion is integral with said chamber and said support means, said drive portion extending toward said transducer means support means.

21. The ink jet apparatus of claim 20 wherein said coupling means, said chamber and said support means comprises a plate-like member.

* * * * *